United States Patent
Verstraete

(10) Patent No.: US 12,485,024 B2
(45) Date of Patent: Dec. 2, 2025

(54) JOINT BALANCING

(71) Applicant: Orthosensor Inc., Dania, FL (US)

(72) Inventor: Matthias Verstraete, Chaam (NL)

(73) Assignee: Howmedica Osteonics Corp., Mahwah, NJ (US)

( * ) Notice: Subject to any disclaimer, the term of this patent is extended or adjusted under 35 U.S.C. 154(b) by 385 days.

(21) Appl. No.: 18/101,747

(22) Filed: Jan. 26, 2023

(65) Prior Publication Data
US 2023/0240864 A1     Aug. 3, 2023

Related U.S. Application Data

(60) Provisional application No. 63/305,323, filed on Feb. 1, 2022.

(51) Int. Cl.
*A61F 2/46*        (2006.01)
*A61F 2/38*        (2006.01)

(52) U.S. Cl.
CPC .............. *A61F 2/4657* (2013.01); *A61F 2/38* (2013.01); *A61F 2002/4666* (2013.01); *A61F 2002/4668* (2013.01)

(58) Field of Classification Search
CPC ............................. A61B 5/4585; A61F 2/4657
See application file for complete search history.

(56) References Cited

U.S. PATENT DOCUMENTS

| | | | |
|---|---|---|---|
| 9,005,298 B2 | 4/2015 | Makower et al. | |
| 10,010,421 B2 | 7/2018 | Makower et al. | |
| 10,285,683 B2 | 5/2019 | Plaskos et al. | |
| 10,321,904 B2 | 6/2019 | Plaskos et al. | |
| 10,639,161 B2 | 5/2020 | Makower et al. | |
| 10,736,746 B2 | 8/2020 | Makower et al. | |
| 10,849,609 B2 | 12/2020 | Plaskos et al. | |

(Continued)

FOREIGN PATENT DOCUMENTS

| | | |
|---|---|---|
| AU | 2016411801 A1 | 2/2019 |
| EP | 2032056 A1 | 3/2009 |

(Continued)

OTHER PUBLICATIONS

Wilson et al, Comparative analysis of the structural properties of the collateral ligaments of the human knee, Journal of Orthopaedic and Sports Physical Therapy, Apr. 2012, pp. 345-351, vol. 42, No. 4.

*Primary Examiner* — Andrew Yang
(74) *Attorney, Agent, or Firm* — Lerner David LLP

(57) ABSTRACT

Disclosed herein are a system for determining ligament tension and a method for utilizing the same in a knee balancing procedure. The system according may include a first sensor to measure a first load at a first condyle of a femur, a second sensor to measure a second load at a second condyle of the femur, an inertial measurement unit to measure angular change of a tibial mechanical axis of a tibia during a rotation of the tibia in a coronal plane, and a display in communication with the first sensor, the second sensor and the inertial measurement unit for displaying a ligament stress-strain curve. The method may include the steps of rotating a tibia toward a first condyle, measuring first load values and first deflection angles of the tibia, and determining a stress-strain curve of a first ligament from the first load values and first deflection angles.

14 Claims, 11 Drawing Sheets

(56) References Cited

U.S. PATENT DOCUMENTS

| | | | |
|---|---|---|---|
| 11,051,798 | B2 | 7/2021 | Plaskos et al. |
| 2005/0038442 | A1* | 2/2005 | Freeman .............. A61B 5/4528 |
| | | | 606/86 R |
| 2010/0217156 | A1* | 8/2010 | Fisher ................... A61F 2/4657 |
| | | | 600/587 |
| 2013/0102929 | A1* | 4/2013 | Haight ................. A61B 17/025 |
| | | | 600/587 |
| 2013/0261631 | A1* | 10/2013 | Ruhling .............. A61B 17/025 |
| | | | 606/86 R |
| 2015/0106024 | A1 | 4/2015 | Lightcap et al. |
| 2018/0132949 | A1* | 5/2018 | Merette .................. G06T 11/60 |
| 2019/0008499 | A1 | 1/2019 | Plaskos et al. |
| 2019/0008501 | A1 | 1/2019 | Plaskos et al. |
| 2019/0147128 | A1 | 5/2019 | O'Connor |
| 2019/0290452 | A1 | 9/2019 | Trabish et al. |
| 2020/0113703 | A1 | 4/2020 | Makower et al. |
| 2021/0186454 | A1 | 6/2021 | Behzadi et al. |
| 2021/0275129 | A1 | 9/2021 | Behzadi et al. |
| 2022/0000397 | A1 | 1/2022 | Fleig et al. |

FOREIGN PATENT DOCUMENTS

| | | | |
|---|---|---|---|
| EP | 2415412 | A2 | 2/2012 |
| WO | 2008137487 | A1 | 11/2008 |
| WO | 2016154356 | A1 | 9/2016 |

\* cited by examiner

JOINT BALANCING

CROSS-REFERENCE TO RELATED APPLICATIONS

This application claims the benefit of the filing date of U.S. Provisional Patent Application No. 63/305,323 filed Feb. 1, 2022, the disclosure of which is hereby incorporated herein by reference.

FIELD OF INVENTION

The present disclosure relates to a system and a method for joint balancing, and particularly to a system and a method for knee joint balancing using ligament tension.

BACKGROUND OF THE INVENTION

A total knee arthroplasty ("TKA") includes replacing a subject's joint with prosthetic joint components. Proper soft tissue tension, joint alignment and balance are necessary for smooth and well-aligned joint movement. Failure to properly identify soft tissue tension and tension the knee accordingly may lead to implant instability and stiffness. Specifically, proper tissue tension of the collateral ligaments—i.e., medial collateral ligament ("MCL") and the lateral collateral ligament ("LCL"), is critical for a balanced knee.

A desired tissue tension of the medial collateral ligament ("MCL") and the lateral collateral ligament ("LCL") during a TKA can be identified by evaluating ligament stress-strain properties. These properties are patient-specific and can be evaluated by manually applying forces and moments to one side of a joint, and subjectively observing the joint movement and compliance under the applied force. The accuracy of soft tissue tension assessment using this approach is largely dependent on surgeon skill. Alternately, a joint distraction device with force sensors can be used to distract the joint and measure soft tissue tension. However, joint distraction devices do not allow a surgeon to individually isolate and tension the MCL or the LCL during distraction because distracting either the medial or lateral side of the joint will invariably cause tension in the opposite ligament. As the individual properties of the MCL and LCL vary significantly, failure to isolate these ligaments and individually measure ligament-specific tension may lead to improper soft tissue tensioning and knee balancing.

Therefore, there exists a need for a system and a method for identifying ligament tension for joint balancing.

BRIEF SUMMARY OF THE INVENTION

Disclosed herein are systems and methods for knee balancing using ligament tension.

In accordance with an aspect of the present disclosure, a method for determining a ligament tension of a knee joint is provided. A method according to this aspect may include the steps of placing a sensor assembly in a knee joint between a femur and a tibia, rotating the tibia in a coronal plane toward a first condyle of the femur, measuring first load values at a first condyle using a first sensor during the rotation step, measuring first deflection angles of the tibia corresponding to the first load values, and determining a stress-strain curve of a first ligament adjacent the second condyle from the first load values and first deflection angles. The sensor assembly may include the first sensor to measure the first load at the first condyle of the femur.

Continuing in accordance with this aspect, the method may further include a step of determining a target ligament stress for the first ligament. The step of determining the target ligament stress for the first ligament may include a step of determining a transition zone of the stress-strain curve. The transition zone may be defined by an intersection of a first region and a second region of the stress-strain curve. The first and second regions may be substantially linear.

Continuing in accordance with this aspect, the sensors may include an inertial measurement unit to measure the first deflection angles. The first deflection angles may be defined by changes in a tibial mechanical axis of the tibia during the rotation of the tibia. Changes in a gap between the second condyle and the tibia during rotation may be derived from the first deflection angles. Changes in the gap may be derived from the first deflection angles and a distance between a force center of the first condyle and a force center of the second condyle.

Continuing in accordance with this aspect, the method may include a step of resecting a proximal end of the tibia prior to the step of placing the sensor assembly in the knee joint. The first ligament may be any of a medial collateral ligament and a lateral collateral ligament.

Continuing in accordance with this aspect, the second condyle may not contact the tibia or the sensor assembly during the rotation of the tibia. A second ligament adjacent the first condyle may be in an unstressed condition during the rotation of the tibia.

Continuing in accordance with this aspect, the method may further include the steps of rotating the tibia in a coronal plane toward the second condyle, measuring second load values at the second condyle using a second sensor of the sensor assembly, measuring second deflection angles of the tibia corresponding to the second load values, and determining a stress-strain curve of a second ligament adjacent the first condyle from the second load values and second deflection angles. The first ligament may be any of a medial collateral ligament and a lateral collateral ligament and the second ligament may be the other of the medial collateral ligament and the lateral collateral ligament.

In another aspect of the present disclosure a system for determining a knee joint ligament tension is provided. A system according to this aspect, may include a first sensor to measure a first load at a first condyle of a femur, a second sensor to measure a second load at a second condyle of the femur, an inertial measurement unit to measure angular change of a tibial mechanical axis of a tibia during a rotation of the tibia in a coronal plane, and a display in communication with the first sensor, the second sensor and the inertial measurement unit for displaying a ligament stress-strain curve. The stress-curve strain may be derived from any of the first and second load values and a corresponding angular change in tibial mechanical axis. The first sensor, the second sensor and the inertial measurement unit may be disposed within a sensor housing. The sensor housing may be configured to be placed in the knee joint between the femur and the tibia and remain therein during the rotation of the tibia in the coronal plane.

Continuing in accordance with this aspect, the knee joint ligament may be any of a medial collateral ligament and lateral collateral ligament.

Continuing in accordance with this aspect, the system may further include a processor in communication with the first sensor, second sensor, inertial measurement unit and the display. The processor may be configured to output the ligament stress-strain curve to the display using any of the first and second load values and a corresponding angular change.

In another aspect of the present disclosure a system for determining knee joint ligament tension is provided. A system according to this aspect, may include a first sensor to measure a first load at a first condyle of a femur, a second sensor to measure a second load at a second condyle of the femur, a tracking device to measure angular change of a tibial mechanical axis of a tibia during a rotation of the tibia in a coronal plane, and a display in communication with the first sensor, the second sensor and the device for displaying a ligament stress-strain curve. The stress-strain curve being derived from any of the first and second load values and a corresponding angular change in tibial mechanical axis. The first sensor and the second sensor may be disposed within a sensor housing. The sensor housing may be configured to be placed in the knee joint between the femur and the tibia and remain therein during the rotation of the tibia in the coronal plane.

Continuing in accordance with this aspect, the tracking device may include any of a camera, navigation system, motion sensor and infrared sensor.

In another aspect of the present disclosure, a method for determining a ligament tension of a knee joint is provided. A method according to this aspect, may include the steps of rotating a tibia in a coronal plane toward a first condyle of a femur, measuring first load values at the first condyle during the rotation step, measuring first deflection angles of the tibia corresponding to the first load values, and determining a stress-strain curve of a first ligament adjacent the second condyle from the first load values and first deflection angles.

Continuing in accordance with this aspect, the step of measuring the first load value may include a step of placing a sensor between the first condyle of the femur and the tibia prior to the step of rotating the tibia.

Continuing in accordance with this aspect, the step of measuring first deflection angles may include measuring an angular change of a tibial mechanical axis of the tibia. The step of measuring the angular change of the tibial mechanical axis may be performed by an inertial measurement unit disposed within the sensor assembly. The step of measuring the angular change of the tibial mechanical axis may be performed using a tracking device. The tracking device may include any of a camera, navigation system, motion sensor and infrared sensor.

Continuing in accordance with this aspect, the method may further include a step of determining a target ligament stress for the first ligament. The step of determining the target ligament stress for the first ligament may include a step of determining a transition zone of the stress-strain curve. The transition zone may be defined by an intersection of a first region and a second region of the stress-strain curve. The first and second regions may be substantially linear.

Continuing in accordance with this aspect, changes in a gap between the second condyle and the tibia during rotation may be derived from the first deflection angles. The changes in the gap may be derived from the first deflection angles and a distance between a force center of the first condyle and a force center of the second condyle.

Continuing in accordance with this aspect, the first ligament may be any of a medial collateral ligament and a lateral collateral ligament. The second condyle may not contact the tibia during the rotation of the tibia. A second ligament adjacent the first condyle may be in an unstressed condition during the rotation of the tibia.

Continuing in accordance with this aspect, the method may further include the steps of rotating the tibia in a coronal plane toward the second condyle, measuring second load values at the second condyle using a second sensor of the sensor assembly, measuring second deflection angles of the tibia corresponding to the second load values, and determining a stress-strain curve of a second ligament adjacent the first condyle from the second load values and second deflection angles.

Continuing in accordance with this aspect, the first ligament may be any of a medial collateral ligament and a lateral collateral ligament and the second ligament may be the other of the medial collateral ligament and the lateral collateral ligament.

BRIEF DESCRIPTION OF THE DRAWINGS

A more complete appreciation of the subject matter of the present invention and the various advantages thereof can be realized by reference to the following detailed description, in which reference is made to the following accompanying drawings.

DETAILED DESCRIPTION

Reference will now be made in detail to the various embodiments of the present disclosure illustrated in the accompanying drawings. Wherever possible, the same or like reference numbers will be used throughout the drawings to refer to the same or like features. It should be noted that the drawings are in simplified form and are not drawn to precise scale. Additionally, the term "a," as used in the specification, means "at least one." The terminology includes the words above specifically mentioned, derivatives thereof, and words of similar import. Although at least two variations are described herein, other variations may include aspects described herein combined in any suitable manner having combinations of all or some of the aspects described.

As used herein, the terms "joint" and "knee joint" will be used interchangeably and as such, unless otherwise stated, the explicit use of either term is inclusive of the other term. Similarly, the terms "load" and "force" will be used interchangeably and as such, unless otherwise stated, the explicit use of either term is inclusive of the other term. Similarly, the terms "tibial angle" and "deflection angle" will be used interchangeably and as such, unless otherwise stated, the explicit use of either term is inclusive of the other term.

In describing preferred embodiments of the disclosure, reference will be made to directional nomenclature used in describing the human body. It is noted that this nomenclature is used only for convenience and that it is not intended to be limiting with respect to the scope of the invention. As used herein, when referring to bones or other parts of the body, the term "anterior" means toward the front part or the face, and the term "posterior" means toward the back of the body. The term "medial" means toward the midline of the body, and the term "lateral" means away from the midline of the body. The term "superior" means closer to the heart, and the term "inferior" means more distant from the heart.

Figure 1:
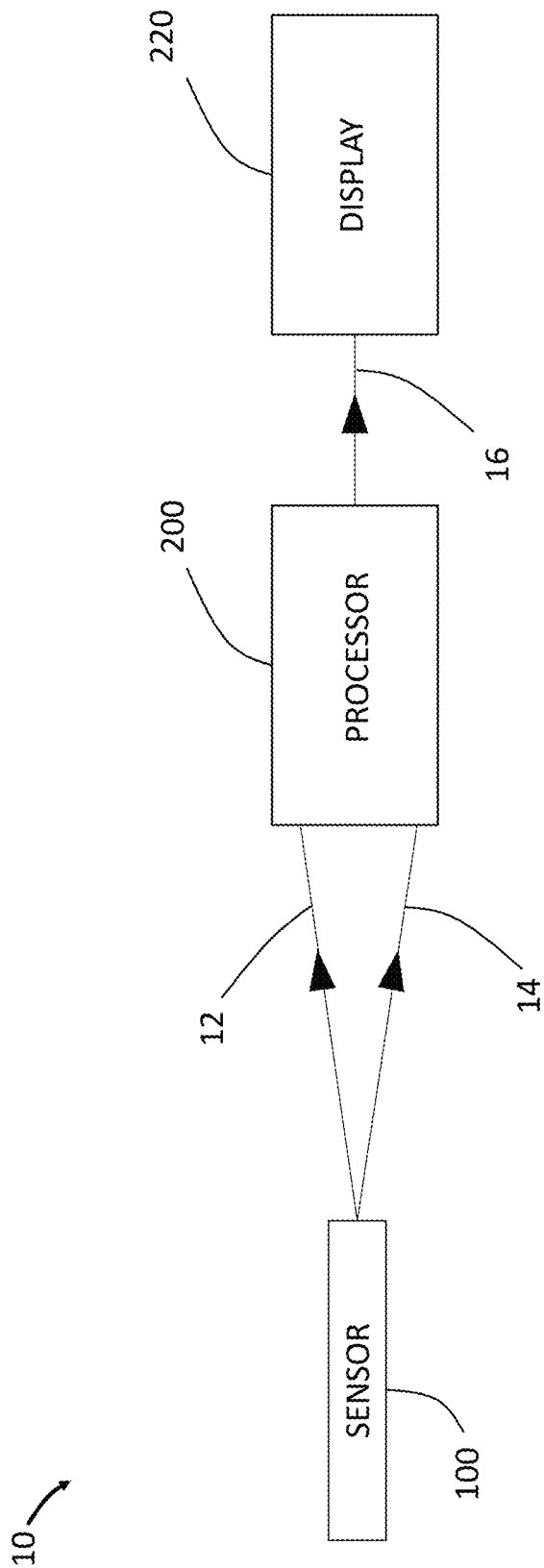
FIG. 1 is a schematic drawing of a system for measuring ligament tension according to an embodiment of the present disclosure.

FIG. 1 is a schematic drawing of a system 10 for measuring joint ligament tension according to an embodiment of the present disclosure. System 10 includes a sensor assembly 100, a processor 200 and a display 220. Sensor assembly 100, as more fully described below, is sized and shaped to be placed in a knee joint. Sensor assembly 100 includes various sensors to detect knee joint related measurements. In this embodiment, sensor assembly 100 detects joint load 12 and tibial angle 14. Joint load 12 can be measured by force sensors on sensor assembly 100 to measure loads between both condyles (medial and lateral) of a femur and a tibia. A resultant force center for each condyle based on a plurality of force vectors applied thereto can be determined by sensor assembly 100 using a plurality of load sensors distributed across each condyle. Force readings from each of these load sensors can be used to identify force centers on the medial and lateral condyle.

Tibial angle 14 indicates an orientation of the tibia and sensor assembly 100 which is placed on the tibia. Tibial angle 14 can be measured by an inertial measurement unit ("IMU") located in sensor assembly 100, or other means such as optical tracking. Thus, joint load 12 and tibial angle 14 can be simultaneously measured and transmitted by sensor assembly 100 in real time. Various anatomical markers can be used to track the tibial angle. For example, a tibial mechanical axis can serve as a reference to track tibial angle 14 as more fully described below. Measurements by sensor assembly 100 are transmitted to processor 200, which in turn calculates and outputs one or more ligament stress-strain curves 16 on display 220. Processor 200 can include software to perform these calculations. While stress-strain curves 16 are shown in this embodiment, various other related force-distance metrics can be used to evaluate ligament tension and identify a desired tension in other embodiments as described below with reference to FIGS. 7 and 8. While processor 200 and display 220 are shown as separate components in FIG. 1, processor 200 can be integrated with sensor assembly 100 or with display 220 in other embodiments. For example, processor 200 can be integrated with display 220 in a tablet, cell phone, workstation, computer, and the like in other embodiments of the present disclosure.

In another embodiment, system 10 can include a tracking device to measure tibial angle 14 instead of utilizing sensor assembly 100. The tracking device can be a camera, navigation system, infrared camera, and the like which can detect changes in the tibial angle. This information, along with joint load 12 measured by sensor assembly 100, can be transmitted to processor 200.

Figure 2:
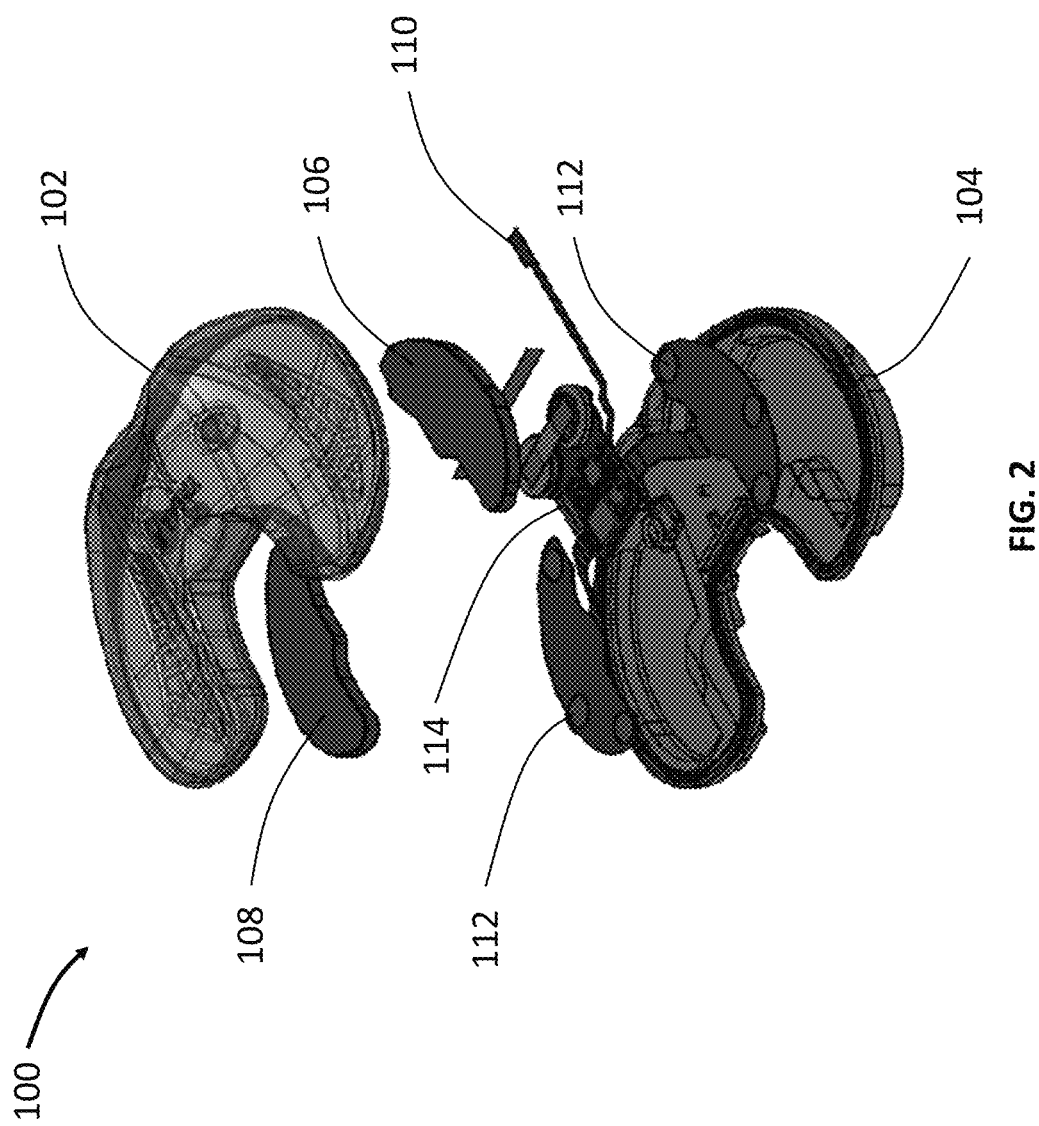
FIG. 2 is an exploded perspective view of a sensor assembly of the system of FIG. 1.

Referring now to FIG. 2, an exploded view of a sensor assembly 100 that can be used in system 10 is shown. Sensor assembly 100 is sized and shaped to be placed into a patient's knee joint and remain in the knee joint during data collection. Sensor assembly 100 includes a housing with a top cover 102 and a bottom cover 104. Top cover 102 is sized and shaped to contact the medial and lateral condyle of a femur, and bottom cover 104 is sized and shaped to contact a tibia. Sensor assembly 100 includes a medial load plate 106 and a lateral load plate 108 placed over load sensors 112 distributed on a medial and lateral side of sensor assembly 100, respectively. Medial load plate 106 measures force and location of the center of the force on a medial side of the knee joint. Multiple load sensors 112 disposed below the medial load plate 106 allow for load magnitude and position of load. Similarly, lateral load plate 108 measures force and location of the center of force on a lateral side of the knee joint. A sensor array 114 is located within the housing of sensor assembly 100, as shown in FIG. 2. Sensor array 114 can include an IMU (3-axis or 6-axis) for alignment measurement to detect tibial angle 12. An antenna 110 of sensor assembly 100 allows for data transmission between sensor assembly 100 and processor 200 or display 220.

It should be noted here that other sensors configured to provide joint load and tibial angle information can be used in the systems and methods disclosed herein. While sensor assembly 100 incudes includes a curved top cover 102 to articulate with the medial and lateral condyles, other sensor may include a flat top surface to contact the medial and lateral condyles. A sensor that provides only joint load can be used in conjunction with a tracker as described above.

Figure 3:
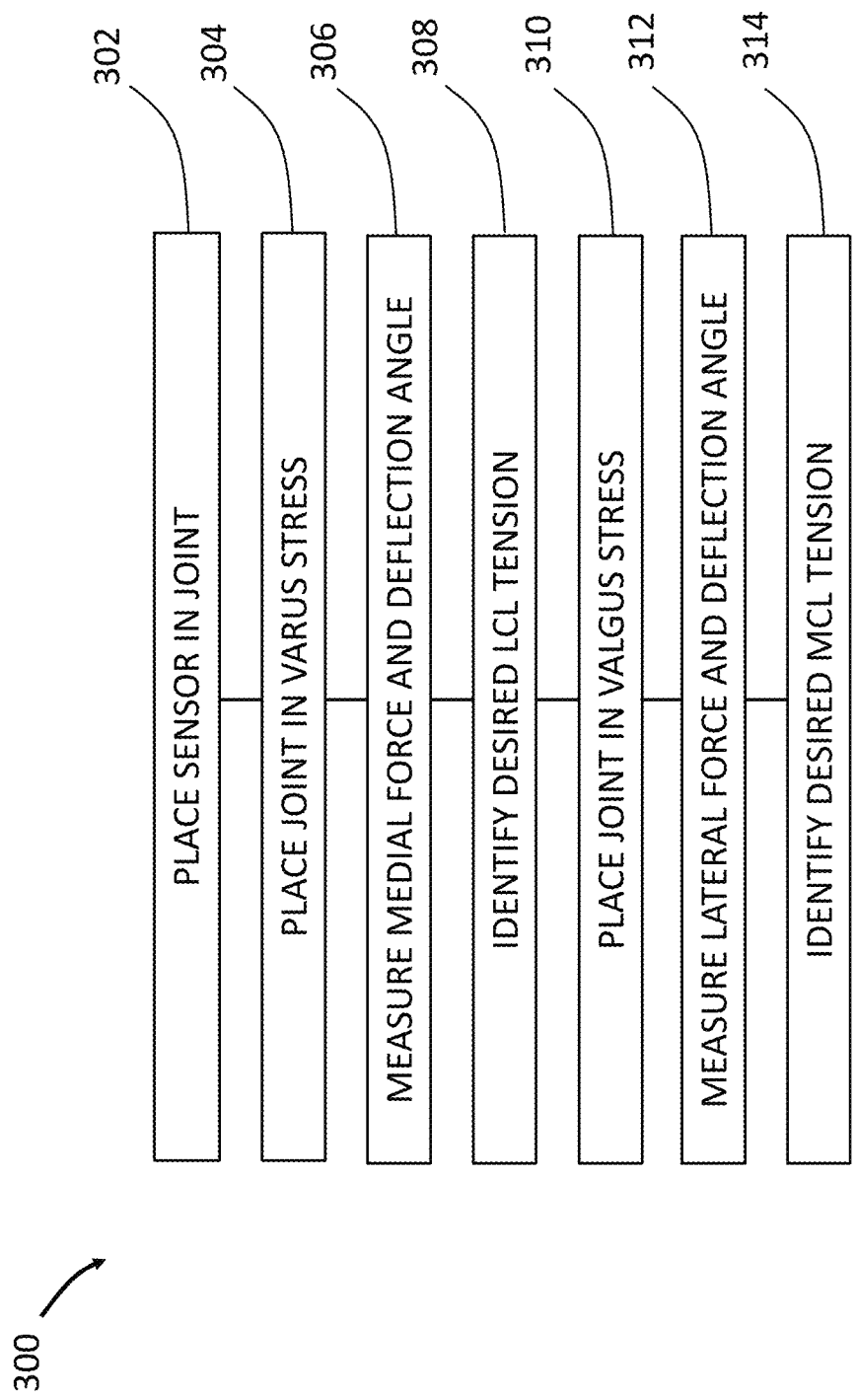
FIG. 3 is a flowchart showing a method for determining ligament tension according to an embodiment of the present disclosure.
Figure 4:
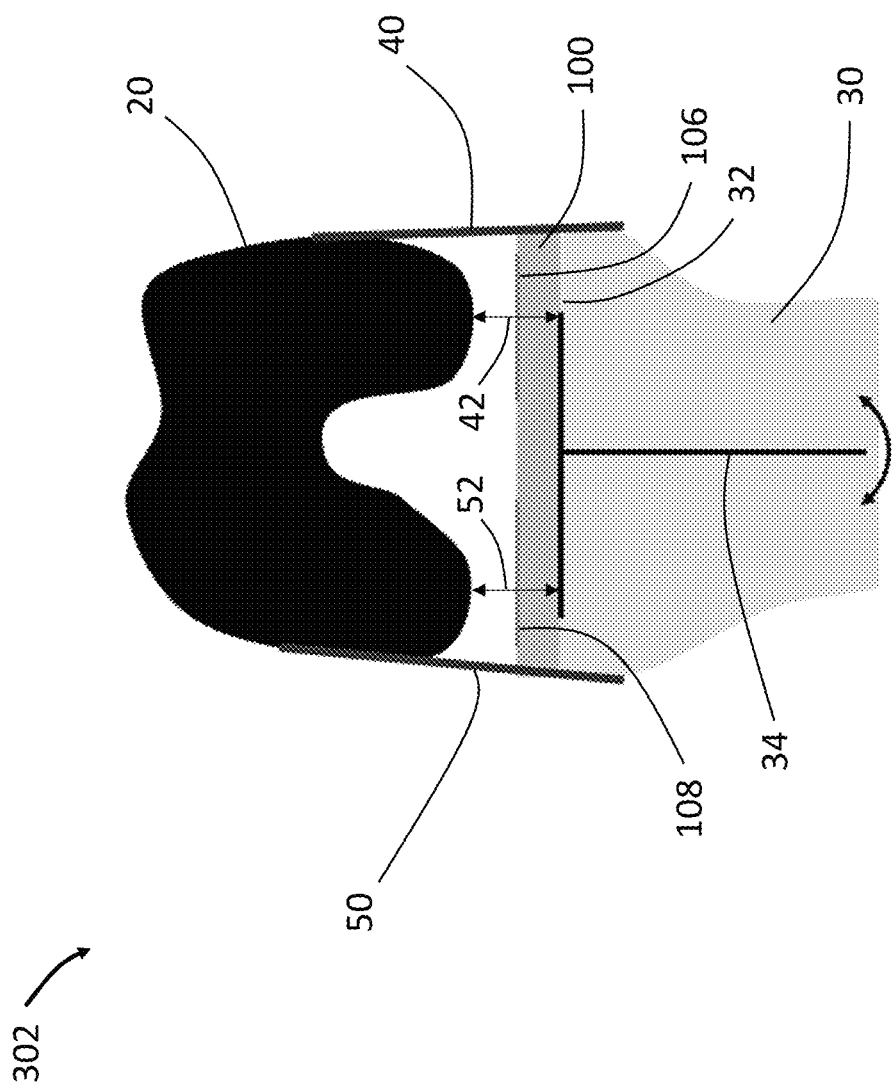
FIG. 4 is a schematic front view of a joint in a first position with the sensor assembly of FIG. 2.

Referring now to FIGS. 3-6, there is shown a method for determining ligament tension according to an embodiment of the present disclosure. FIG. 3 is a flowchart showing steps of a method 300 to identify desired ligament tension for an MCL and an LCL during a knee balancing evaluation. In a first step 302 of method 300, a sensor, such as sensor assembly 100, can be placed in a knee joint in a first unstressed position as best shown in FIG. 4. Sensor assembly 100 is placed in the knee joint between a femur 20 and a tibia 30. Sensor assembly 100 is placed on a proximal tibial cut 32 in this embodiment, as shown in FIG. 4. Medial load plate 106 of sensor assembly 100 is located below a medial condyle of femur 20 and a lateral load plate 108 of sensor assembly 100 is located below a lateral condyle of femur 20. While femur 20 is in a flexion position with respect to tibia 30 in this first unstressed position shown in FIG. 4, the methods and system of the present disclosure can be performed with the femur in other positions with respect to tibia 30, such as full extension, 10-degree extension, and the like. An MCL 40 and an LCL 50 of the knee joint are unstressed in the first position. Both medial load plate 106 and lateral load plate 108 do not contact the condyles of femur 40, and thus no load is registered by either load plates of sensor assembly 100 in the first position of the knee joint. A medial gap 42 is measured between the medial condyle and tibia 30, and a lateral gap 52 is measured between the lateral condyle and tibia 30, as show in FIG. 4. A tibial mechanical axis 34 serves as reference to measure tibial angle 14. While tibial mechanical axis 34 is disclosed in this embodiment, any other marker, such as a line extending transverse to tibial cut 32 can serve as a reference to track changes in tibial angle 14.

Figure 5:
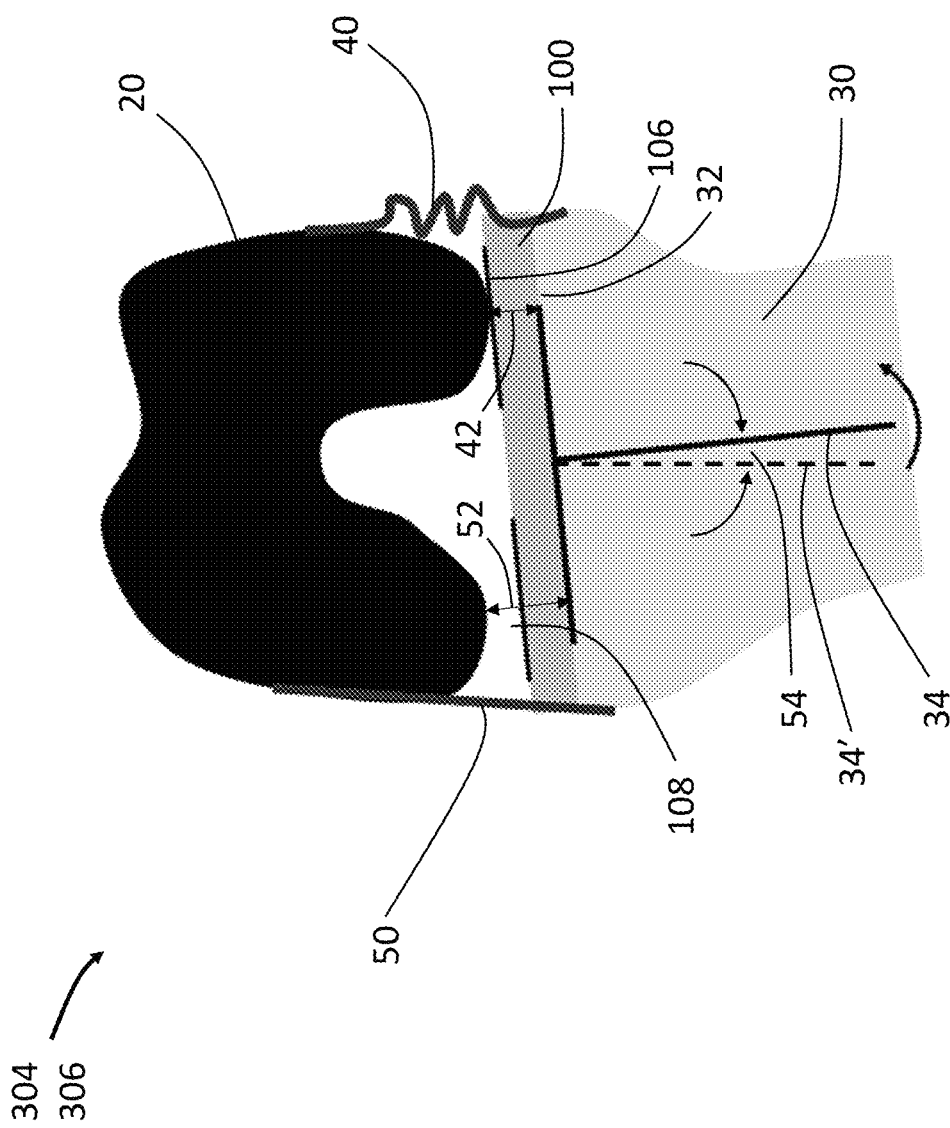
FIG. 5 is a schematic front view of the joint of FIG. 4 in a second position.

In a second step 304 of method 300, the knee joint is placed in varus stress by moving tibia 30 toward the medial condyle as shown in FIG. 5. In this second position, the medial condyle of femur 20 contacts medial load plate 106 of sensor assembly 100. Concurrently, in a third step 306 of method 300, medial loads and changes in deflection angles are measured by sensor assembly 100. Medial loads measured by medial load plate 106 are directly related to stress experienced by LCL 50. As MCL 40 is completely unstressed during this step, the medial load measured during this step is directly related to tension in the LCL without any influence from the MCL. In other words, the laxity or lack thereof of LCL dictates how much force is applied to medial load plate 106. A deflection angle 54—i.e., the angular change of tibial mechanical axis 34—is defined by a new position of tibial mechanical axis 34 and the original position of tibial mechanical axis 34' as shown in FIG. 5. Any increase in the deflection angle 54 causes a corresponding increase in LCL tension which is registered by medial load plate 106 of sensor assembly 100.

In a fourth step 308, a desired LCL tension is identified by analyzing the medial load values and the corresponding deflection angles 54 measured during the varus stress test. This can be done by plotting stress-strain curves of the LCL as more fully described with reference to FIG. 8 below.

Figure 7:
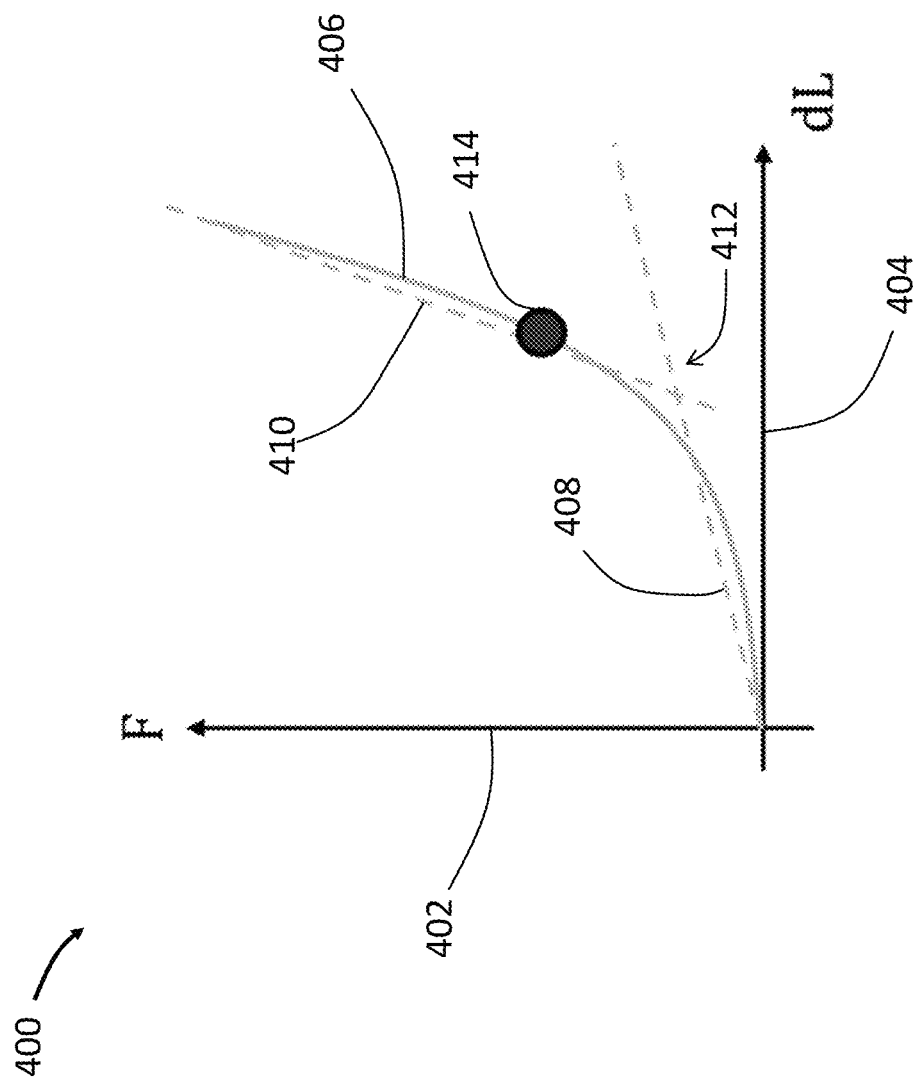
FIG. 7 is a graph showing a ligament stress-strain curve.

FIG. 7 shows an exemplary method of identifying a desired ligament tension. FIG. 7 which shows a graph 400 of a ligament stress-strain curve 406 illustrating a relationship between force or tension 402 in the ligament shown on a y-axis and a corresponding change in length 404 (strain) shown on an x-axis. As shown here, ligament stress-strain curve 406 can be generally characterized into a first linear region 408 and a second linear region 410. First linear region 408 can represent ligament transition from a non-aligned state to an aligned state under tension. Second linear region 410 can represent elastic deformation of the aligned ligaments under tension. A transition region 412 where the first linear region 408 and second linear region 410 intersect is generally considered to be an ideal target 414 for ligament tension as shown in FIG. 7. However, target for ligament tension can vary based on surgeon preference, patient age, patient activity level, patient body mass index ("BMI"), patient gender, ligament condition, implant selection, and the like in other embodiments of the present disclosure. For example, a surgeon may choose a higher ligament tension for a younger active patient and a lower ligament tension for an older inactive patient. In another embodiment, processor 200 of system 10 can include software to automatically detect transition region 412 and output a recommended ligament tension based on the transition region, or the transition region and any or all of the other parameters described above.

Figure 6:
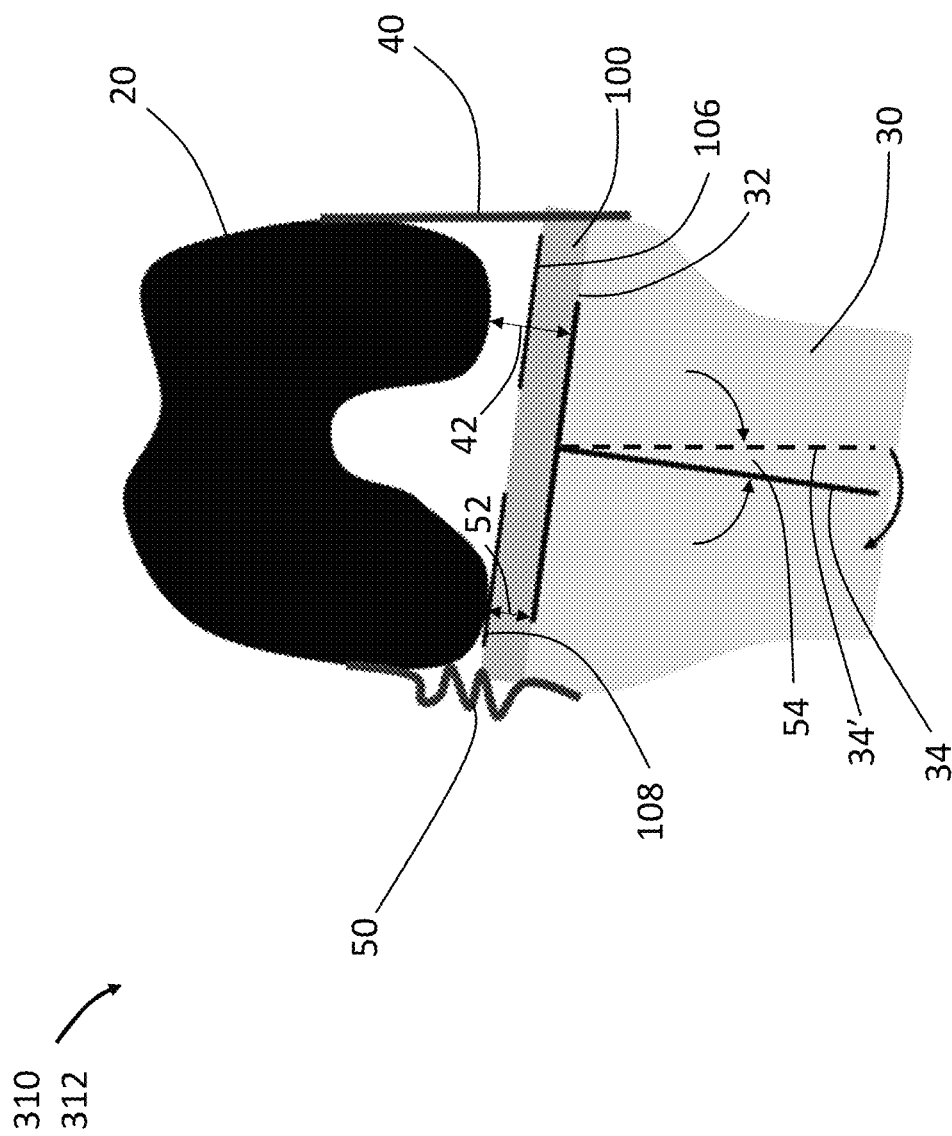
FIG. 6 is a schematic front view of the joint of FIG. 4 in a third position.

In a fifth step 310 of method 300, the knee joint is placed in valgus stress by moving tibia 30 toward the lateral condyle as shown in FIG. 6. In this third position, the lateral condyle of femur 20 contacts lateral load plate 108 of sensor assembly 100. Concurrently in a sixth step 312 of method 300, lateral loads and changes in deflection angles are measured by sensor assembly 100. Lateral load measured by lateral load plate 108 is directly related to stress experienced by MCL 40. As LCL 50 is unstressed during this step, the lateral load measured during this step is directly related to tension in the MCL without any influence from the LCL. In other words, the laxity or lack thereof of MCL dictates how much force is applied to lateral load plate 108. The angular change of tibial mechanical axis 34, is defined by new position of tibial mechanical axis 34 and the original position of tibial mechanical axis 34' as shown in FIG. 6. Any increase in the deflection angle 54 causes a corresponding increase in MCL tension which is registered by lateral load plate 108 of sensor assembly 100.

In a final step 314, a desired LCL tension is identified by analyzing the lateral load values and the corresponding deflection angles 54. This can be done by plotting stress-strain curves of the MCL as more fully described with reference to FIG. 8 below.

Figure 8:
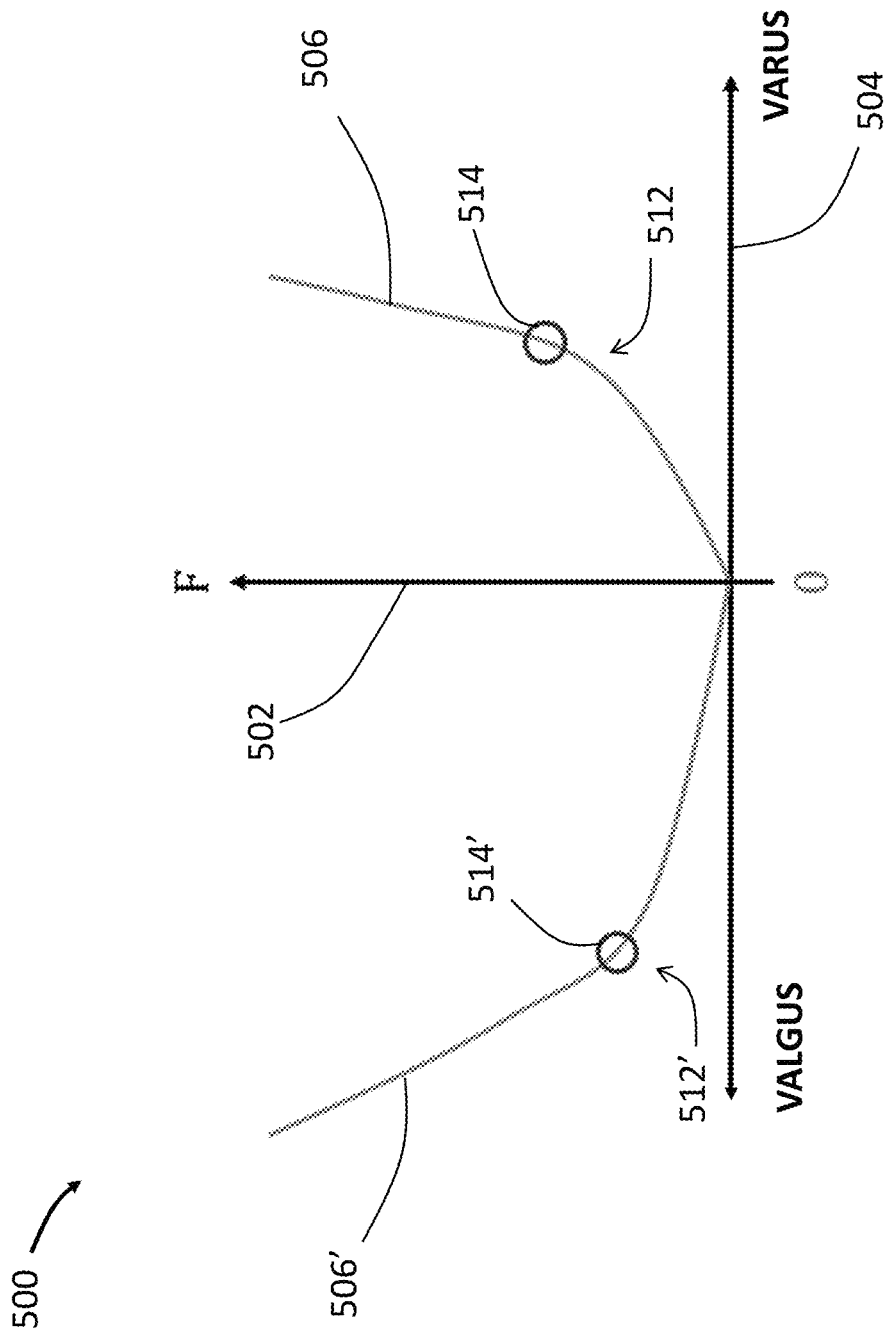
FIG. 8 is a graph showing MCL and LCL load-deflection curves for the joint of FIG. 4.

FIG. 8 shows a graph 500 showing an MCL load-deflection curve 506 and an LCL load-deflection curve 506' generated from the steps of method 300. Graph 500 is similar to graph 400, and therefore like elements are referred to with similar numerals within the 500-series of numbers. For example, graph 500 shows the relationship between force or tension 502 in MCL 50 shown on a y-axis and a corresponding change in angular position 504 shown on an x-axis. However, graph 500 also includes a corresponding LCL load-deflection curve 506'. Change in ligament length can be calculated from tibial angle 14 and a distance between the ligament and tibial mechanical axis 34.

Both the MCL load-deflection curve 506 and the LCL load-deflection curve 506' exhibit two distinct regions intersecting at transition regions 512 and 512', respectively. However, there are significant differences in the stiffness and strength between MCL 40 and LCL 50 as shown in graph 500. Quantifying these differences allows a surgeon to accurately select tension specific to each ligament for a patient. Thus, graph 500 allows a surgeon to identify and select a patient-specific and a ligament-specific tension conveniently and accurately for the LCL and the MCL. Alternatively, processor 200 can be provided with software to assist the surgeon to identify patient-specific and ligament-specific tension as described above.

Patient-specific and ligament-specific tension data measured using the systems and method disclosed herein can be used to create a ligament tension database. Attributes such as patient age, patient activity level, patient body mass index ("BMI"), patient gender, ligament condition, implant selection, and the like can be added to the database and linked to corresponding ligament tension values. A surgeon can access this database, either directly or via processor 200, and input a patient's attributes to identify and select appropriate ligament tension(s) for the patient.

Figure 9:
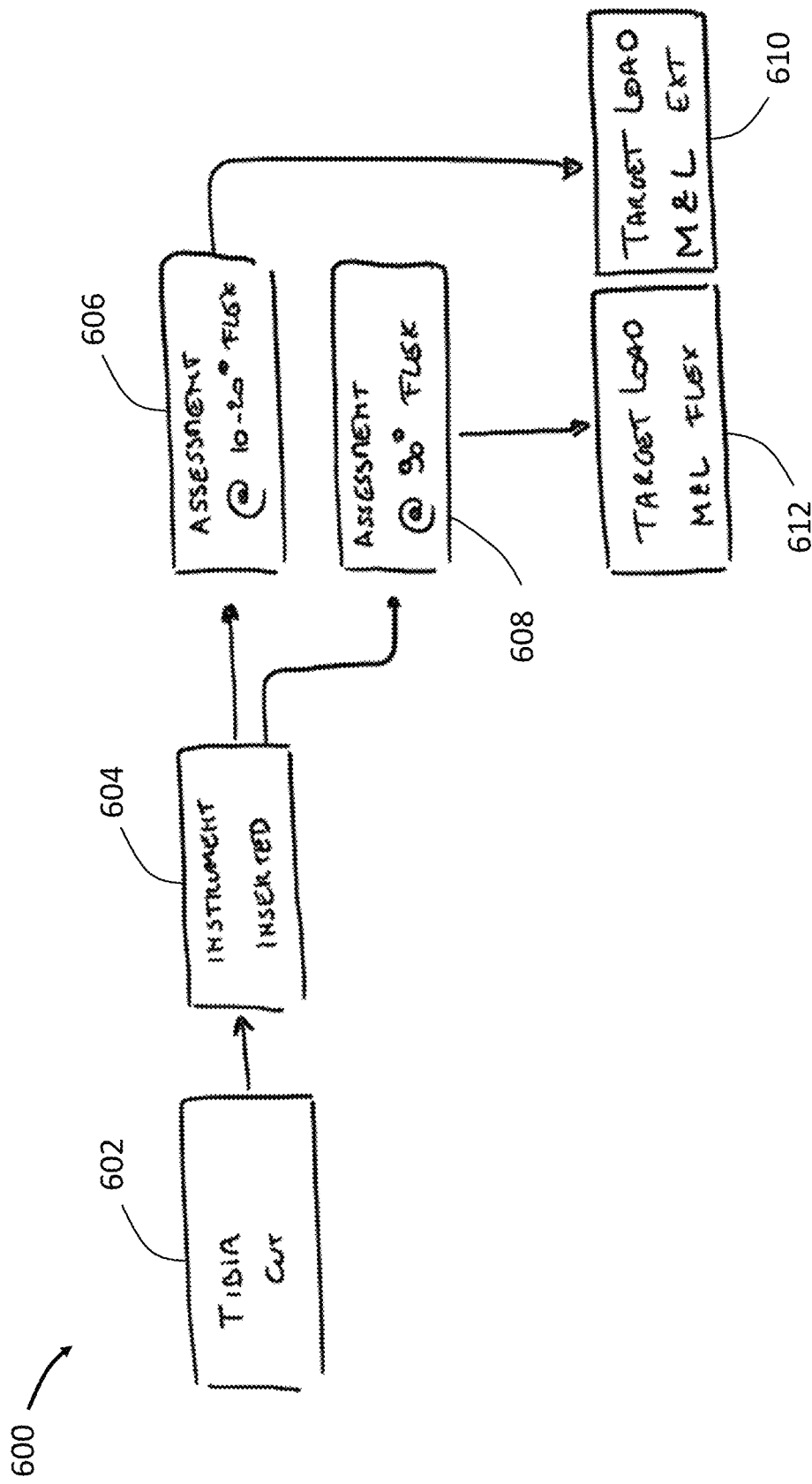
FIG. 9 is a flowchart showing a method for determining ligament tension according to an embodiment of the present disclosure.

FIG. 9 is a flowchart showing steps of a method 600 for determining desired LCL and MCL tensions for a knee joint according to an embodiment of the present disclosure. In a first step 602, a proximal tibial cut is performed. A load measuring tensioner or sensor assembly 100 is then inserted into the knee joint in a step 602. The knee joint is then placed in an extension position at a flexion angle between 10-20 degrees in a step 606. The desired LCL and MCL tensions in the extension position are measured and identified in a step 610 as more fully described above. Similarly, the desired LCL and MCL tensions in a flexion position of the knee joint are determined by first placing the knee joint in a flexion position at a 90 degree flexion angle in a step 608, followed by measuring and identifying desired LCL and MCL tensions in a step 612. Thus, the desired tensions (i.e., target loads) for the LCL and MCL at both extension and flexion positions of the knee joint can be determined by method 600. While a flexion angle of 10-20 degrees for the extension position and a flexion angle of 90 degrees is described here, other angles for knee flexion and extension positions can be used in other embodiments.

Figure 10:
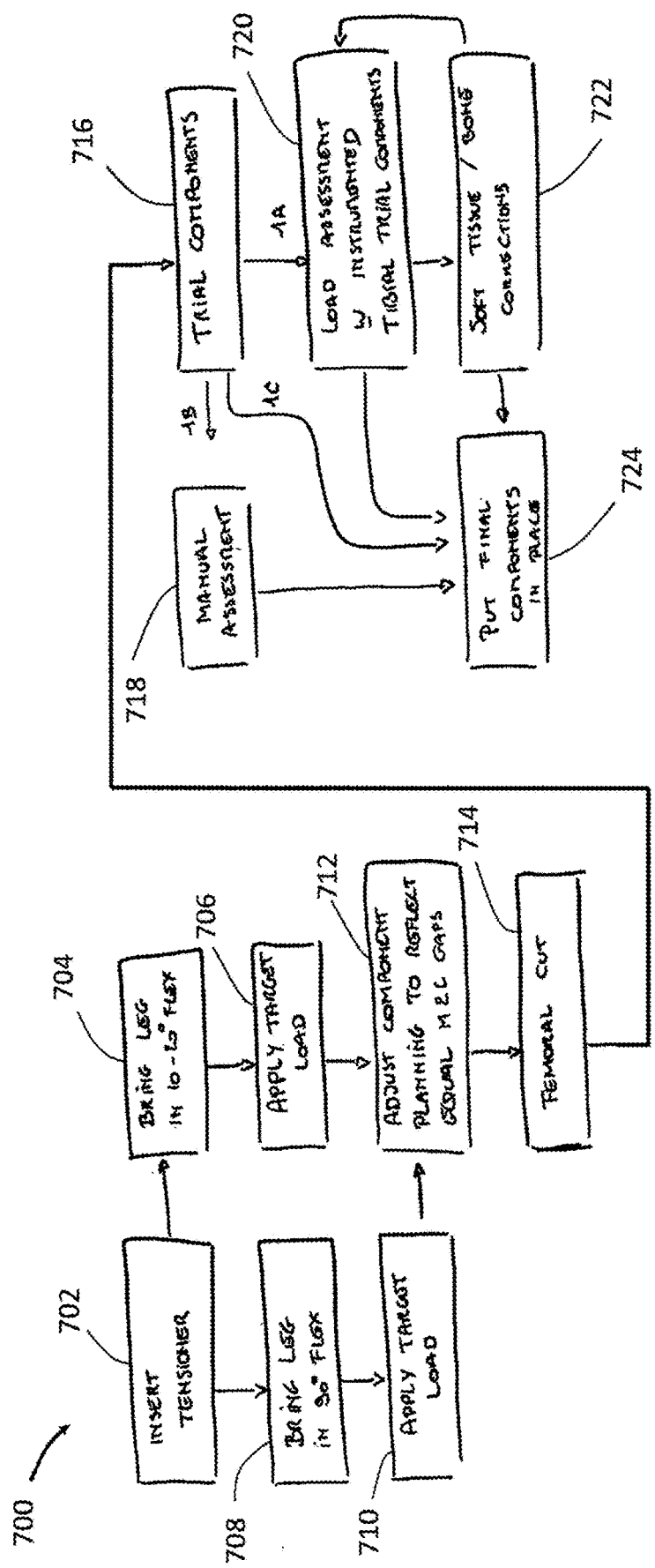
FIG. 10 is a flowchart showing a method for a knee procedure according to an embodiment of the present disclosure.

FIG. 10 is a flowchart showing steps of a method 700 for implanting knee implants or components utilizing desired LCL and MCL tensions according to an embodiment of the present disclosure. LCL and MCL tensions are first measured and identified in extension and flexion positions of a knee joint as more fully described above. A tensioner capable of measuring medial and lateral loads is inserted into the knee joint at a step 702. Examples of tensioners capable of measuring medial and lateral loads are disclosed in U.S. Patent Application Publication No. 2019/0290452, the disclosure of which is hereby incorporated by reference herein. The knee joint is then positioned in extension (i.e., about 10-20 degree flexion angle) in a step 704. The tensioner is then used to distract the knee joint to vary the gap between the femur and the tibia until the LCL and MCL tensions match the previously identified targets for extension in a step 706. The resulting gaps between the femur and the tibia on the medial and lateral sides in extension are then noted. Similarly, the knee joint is then positioned in flexion (i.e., about 10-20 degree flexion angle) in a step 708, and distracted with the tensioner to vary the gap between the femur and the tibia until the LCL and MCL tensions match the previously identified targets for flexion in a step 710. Once the medial and lateral gaps for extension and flexion are noted in steps 706 and 710, respectively, implant planning (including sizing and positioning) is adjusted to reflect the measured gaps in a step 712. For example, if the implant planning was initially based on equal medial and lateral gaps in extension and flexion, the gaps measured in step 712 is used to update the implant planning with the measured values so that the plan continues with equal gaps or is revised to have differently sized gaps in extension and flexion. Once the desired flexion/extension gap values are determine based on the target MCL and LCL target loads, the desired varus/valgus angle and depth of resections of the femur can be determined or accordingly revised from the preoperative plan. One or more femoral cuts are then performed in a step 714 based on the updated implant planning of step 712.

Trial implants selected in accordance with the updated implant planning of step 712 are then placed on the resected femur and tibia in a step 716. In a first alternative, LCL and MCL tensions are measured with the tensioner or sensor assembly 100 with the trial implants placed in the knee joint in a step 720. If the measured LCL and MCL tensions do not match the desired LCL and MCL tensions, soft tissue balancing, or bone corrections may be performed in a step 722. In a second alternative, a manual assessment of the trial components can be performed in a step 718. The manual assessment can be based on moving the knee joint through a range of motion with the trial implants and evaluating tactile and visual feedback during this process to assess implant fit. Based on the outputs of steps 716, 718, 720 or 722, final implants are selected and properly positioned in a step 724.

Figure 11:
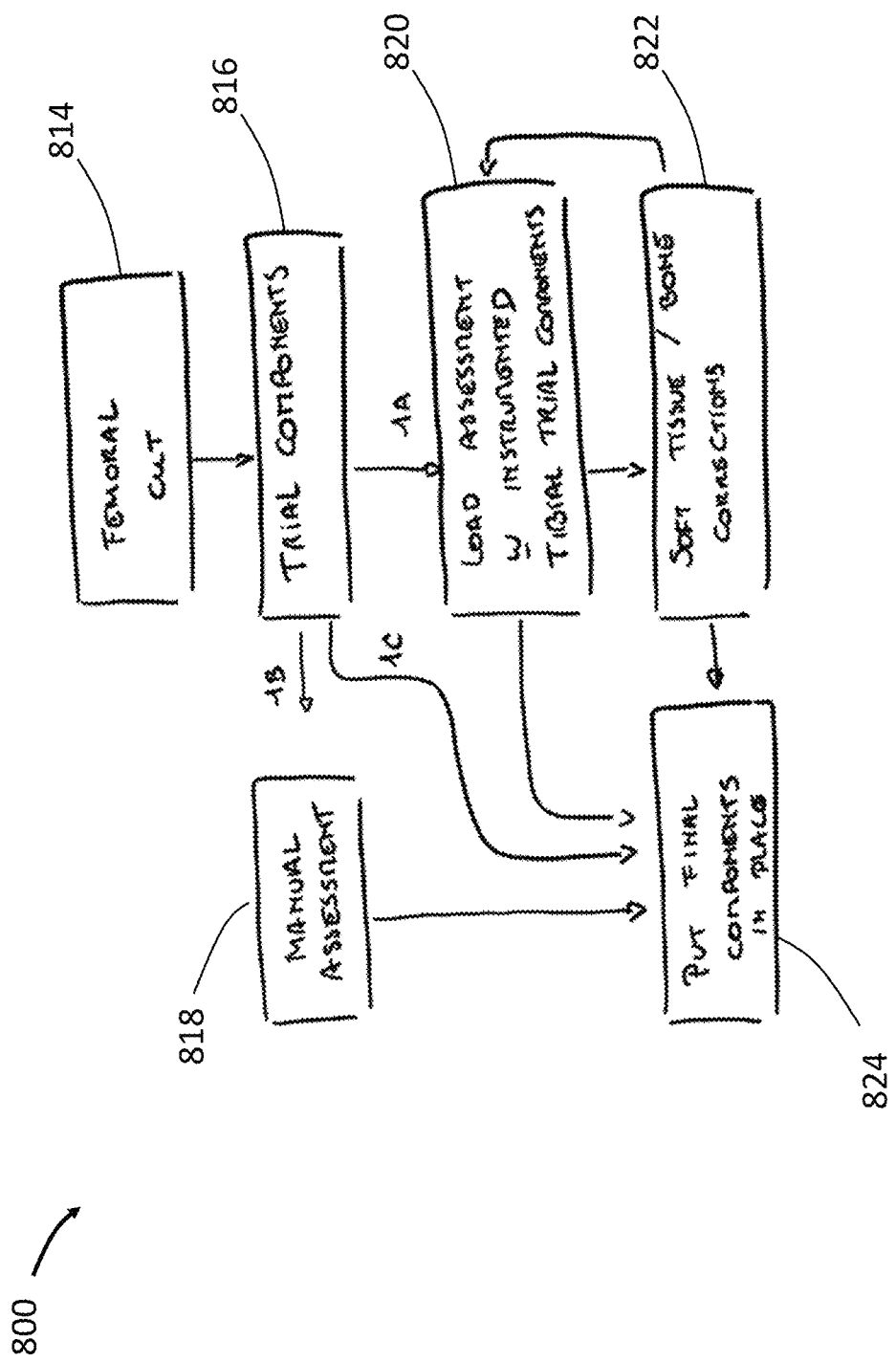
FIG. 11 is a flowchart showing a method for a knee procedure according to another embodiment of the present disclosure.

FIG. 11 is a flowchart showing steps of a method 800 for implanting knee implants or components utilizing desired LCL and MCL tensions according to an embodiment of the present disclosure. Method 800 is similar to method 700, and therefore like method steps are referred to with similar numerals within the 800-series. For example, method 800 includes a step 814 to perform one or more femoral resections, and a step 816 of placing trial implants on the resected femur and tibia. However, method 800 does not include an updated implant plan based on measured medial and lateral gaps for extension and flexion derived from steps 704-712 of method 700. Instead, the desired LCL and MCL tensions are achieved by a combination of trial implant selection in step 816 and soft tissue balancing and bone correction in step 822. For example, after placing the selected trial implants on the resected femur and tibia, a surgeon can measure and adjust LCL and MCL tensions in flexion and extension by soft tissue adjustments or bone corrections to match desired target tensions.

While a tibial angle is used to determine the deflection angle in the systems and methods of the present disclosure, a femoral angle or other similar markers can be used in other embodiments. Instead of moving the tibia in a coronal plane during the varus-valgus stress test disclosed here, other embodiments can includes moving the tibia in a coronal or transverse plane. While the methods and systems of the present disclosure generally refer to assessing the LCL and the MCL, the methods and systems disclosed herein can be used to assess any or all medial and lateral stabilizing structures. The methods and system of the present disclosure can be used to assess anterior cruciate ligament and posterior cruciate ligament tension. Furthermore, while the present disclosure generally refers to a knee joint, the systems and methods of the present disclosure can also be used to measure ligament tension of various other joints such as the shoulder, hip, ankle, wrist, etc. While the method above is manually performed, other embodiments can use systems of the present disclosure in robotic procedures.

Furthermore, although the invention disclosed herein has been described with reference to particular features, it is to be understood that these features are merely illustrative of the principles and applications of the present invention. It is therefore to be understood that numerous modifications, including changes in the sizes of the various features described herein, may be made to the illustrative embodiments and that other arrangements may be devised without departing from the spirit and scope of the present invention. In this regard, the present invention encompasses numerous additional features in addition to those specific features set forth in the paragraphs below. Moreover, the foregoing disclosure should be taken by way of illustration rather than by way of limitation as the present invention is defined in the examples of the numbered paragraphs, which describe features in accordance with various embodiments of the invention, set forth in the paragraphs below.

The invention claimed is:

1. A method for determining a ligament tension of a knee joint, the method comprising the steps of:
   placing a sensor assembly in a knee joint between a femur and a tibia, the sensor assembly including a first sensor to measure a first load at a first condyle of the femur;
   rotating the tibia in a coronal plane toward the first condyle of the femur;
   measuring a first set of load values at the first condyle using the first sensor during the step of rotating the tibia;
   measuring a first set of deflection angles of the tibia corresponding to the first set of load values, and
   determining a stress-strain curve of a first ligament adjacent a second condyle from the first set of load values and first set of deflection angles.

2. The method of claim 1, further including a step of determining a target ligament stress for the first ligament.

3. The method of claim 2, wherein the step of determining the target ligament stress for the first ligament includes a step of determining a transition zone of the stress-strain curve, the transition zone being defined by an intersection of a first region and a second region of the stress-strain curve.

4. The method of claim 3, wherein the first and second regions are substantially linear.

5. The method of claim 2, wherein the sensor assembly includes an inertial measurement unit to measure the first deflection angles.

6. The method of claim 2, wherein the first set of deflection angles are defined by angular changes in a tibial mechanical axis of the tibia during the rotation of the tibia.

7. The method of claim 6, further including a step of determining length changes in a gap between the second condyle and the tibia during rotation, the length changes being derived from the first set of deflection angles.

8. The method of claim 7, wherein changes in the gap are derived from the first set of deflection angles and a distance between a force center of the first condyle and a force center of the second condyle.

9. The method of claim 1, further including a step of resecting a proximal end of the tibia prior to the step of placing the sensor assembly in the knee joint.

10. The method of claim 1, wherein the first ligament is any one of a medial collateral ligament and a lateral collateral ligament.

11. The method of claim 1, wherein the second condyle does not contact the tibia and the sensor assembly during the rotation of the tibia.

12. The method of claim 11, wherein a second ligament adjacent the first condyle is in an unstressed condition during the rotation of the tibia.

13. The method of claim 1, further including the steps of:
rotating the tibia in a coronal plane toward the second condyle;
measuring a second set of load values at the second condyle using a second sensor of the sensor assembly;
measuring a second set of deflection angles of the tibia corresponding to the second set of load values, and
determining a stress-strain curve of a second ligament adjacent the first condyle from the second set of load values and second set of deflection angles.

14. The method of claim 13, wherein the first ligament is any of a medial collateral ligament and a lateral collateral ligament, and the second ligament is the other of the medial collateral ligament and the lateral collateral ligament.

* * * * *